(12) United States Patent
Sugiura et al.

(10) Patent No.: US 6,835,158 B2
(45) Date of Patent: Dec. 28, 2004

(54) AUTOMATIC TRANSMISSION

(75) Inventors: Nobutada Sugiura, Anjo (JP); Minoru Todo, Anjo (JP); Yoshinobu Nozaki, Toyota (JP); Hideo Tomomatsu, Toyota (JP)

(73) Assignees: Aisin Aw Co., Ltd. (JP); Toyota Jidosha Kabushiki Kaisha (JP)

( * ) Notice: Subject to any disclaimer, the term of this patent is extended or adjusted under 35 U.S.C. 154(b) by 0 days.

(21) Appl. No.: 10/373,657

(22) Filed: Feb. 26, 2003

(65) Prior Publication Data

US 2003/0224900 A1 Dec. 4, 2003

(30) Foreign Application Priority Data

Feb. 26, 2002 (JP) ...................................... 2002-050331

(51) Int. Cl.[7] ................................................ F16H 3/44
(52) U.S. Cl. ...................................................... 475/281
(58) Field of Search ................................ 475/281, 280

(56) References Cited

U.S. PATENT DOCUMENTS

| | | | | |
|---|---|---|---|---|
| 3,835,732 A | * | 9/1974 | Mori et al. ................. | 475/276 |
| 5,226,862 A | | 7/1993 | Hattori ....................... | 475/286 |
| 5,435,792 A | * | 7/1995 | Justice et al. ............... | 475/276 |

* cited by examiner

*Primary Examiner*—Dirk Wright
(74) *Attorney, Agent, or Firm*—Lorusso, Loud & Kelly

(57) ABSTRACT

An automatic transmission has a first brake, a third brake and a hydraulic actuator for the third brake substantially axially aligned in sequence from rear to front in a radially outer area of the transmission. In addition, a first planetary gear unit, a first one-way clutch and a second one-way clutch are provided in an axial sequence from rear to front, in a radially inner area of the transmission. In this manner, component members are mounted with good spatial efficiency in both radial and axial dimensions. Furthermore, because a carrier of the first planetary gear is connected to a third brake through the first one-way clutch, the carrier can be reversely rotated by disengaging the third brake, enabling six forward speeds.

10 Claims, 12 Drawing Sheets

| OPERATION TABLE | C1 | C2 | C3 | B1 | B2 | B3 | B4 | F1 | F2 | F3 |
|---|---|---|---|---|---|---|---|---|---|---|
| P | | | | | | | | | | |
| REV | | | ○ | (○) | | ○ | ○ | ○ | | |
| N | | | | | | | | | | |
| 1ST | ○ | | | | | | | | | ○ |
| 2ND | ○ | | | | (○) | ○ | (○) | | ○ | |
| 3RD | ○ | | ○ | (○) | | ○ | | ○ | | |
| 4TH | ○ | ○ | ● | | | ● | | | | |
| 5TH | | ○ | ○ | ○ | | ● | | | | |
| 6TH | | ○ | ● | | ○ | | | | | |

(○) DENOTES DURING ENGINE BRAKING

● DENOTES ENGAGEMENT, BUT NO TORQUE TRANSFER

OPERATION TABLE

| | C1 | C2 | C3 | C4 | B1 | B2 | B3 | B4 | F0 | F1 | F2 | F3 |
|---|---|---|---|---|---|---|---|---|---|---|---|---|
| P | | | | | | | | | | | | |
| REV | | | ○ | | | | ○ | ○ | | ○ | | |
| N | | | | | | | | | | | | |
| 1ST | ○ | | | (○) | | | | | ○ | | | ○ |
| 2ND | ○ | | | (○) | | (○) | ○ | | ○ | | ○ | |
| 3RD | ○ | ○ | | (○) | | | ○ | | ○ | ○ | | |
| 4TH | ○ | ○ | (○) | | | | ● | (○) | ○ | ○ | | |
| 5TH | ● | ○ | ○ | | | ○ | ● | | | | | |
| 6TH | ● | ○ | ○ | | ○ | | | | | | | |

(○) DENOTES DURING ENGINE BRAKING

● DENOTES ENGAGEMENT, BUT NO TORQUE TRANSFER

AUTOMATIC TRANSMISSION

The disclosure of Japanese Patent Application No. 2002-050331 filed on Feb. 26, 2002 including the specification, drawings and abstract are incorporated herein by reference in its entirety.

BACKGROUND OF THE INVENTION

1. Field of Invention

The present invention relates to an automatic transmission that is mounted in a vehicle such as an automobile. More specifically, the present invention relates to a structure of a gear section that is designed for use in an automatic transmission provided with a plurality of clutches disposed together in a front half portion, with the gear section in a rear half portion.

2. Description of Related Art

An automatic transmission that is mounted in a vehicle such as an automobile and that is provided with a plurality of clutches disposed together in a front half portion, with gearing in a rear half portion is conventional. FIGS. 11 and 12 show known examples of this kind of automatic transmission. The automatic transmissions shown in these skeletal drawings are disclosed, in the order shown, as FIGS. 1 and 3 of Japanese Patent Laid-Open Publication 04-285347. These automatic transmissions are provided with clutches C1 and C2 disposed together in a front half portion and gearing (first, second and third planetary gear sets G1, G2 and G3) in a rear half portion, and provide six forward shift speeds by use of the gear trains shown in FIGS. 11 and 12. Note that Explanation of symbols that is unnecessary for understanding this related art has been omitted where appropriate.

Recently, from the point of view of improving fuel consumption, there have been strong demands to make automatic transmissions multi-speed. At the same time, from the point of view of mountability, strong demands have been made to make the automatic transmission unit itself more compact. The objective of making automatic transmissions multi-speed, however, is at odds with the objective of making them more compact. Furthermore, it is also required that automatic transmissions have good controllability. In other words, for example, comfortable shifting without shift shock is required along with simple control. In general, as one method to achieve this, widespread use has been made of a one-way clutch.

In the automatic transmissions shown in FIGS. 11 and 12, however, a one-way clutch is not provided and, therefore it can be inferred that shifting is carried out using a clutch-to-clutch method which incurs the problem of poor controllability.

Here, for example, if an attempt were to be made to provide six forward speeds by use of a one-way clutch as an essential element of the structure of the related art described above, one approach might be modification of the structures shown in FIGS. 11 and 12 by providing the one-way clutch in parallel with a third brake B3, in relation to a rotating element in the form of the sun gear S1 in FIG. 11 or the carrier PC1 in FIG. 12. However, providing a one-way clutch in such a relationship to the rotating element would have the one-way clutch stop reverse rotation of the rotating element because the input shaft I and the rotating element are directly linked. It would therefore be impossible to achieve six speeds.

SUMMARY OF THE INVENTION

In view of the foregoing problems, it is an object of the present invention to provide an automatic transmission that has a compact structure and excellent controllability with one-way clutch shifting.

Accordingly, the present invention provides an automatic transmission including an input shaft, a first planetary gear unit, a second planetary gear unit or "set" (a rear gear unit) that includes at least four rotating elements, and an output shaft. The automatic transmission changes rotational speed of the input shaft among a plurality of shift speeds and outputs the changed speed at an output shaft by use of the planetary gear units. In the automatic transmission, the first planetary unit includes a first speed-changing element (a sun gear) to which the rotation of the input shaft is input, a second speed-changing element (a carrier) that is engaged and disengaged by a first engagement mechanism (a first brake) and a third engagement mechanism (a third brake and a first one-way clutch), and a third speed-changing element (a ring gear) that transfers rotation, at a different speed than that of the rotation of the input shaft, to the second (rear) planetary gear unit ("set"). The first engagement mechanism is in the form of the first brake, and the third mechanism includes the first one-way clutch, which engages and disengages the second speed-changing element, and the third brake which engages and disengages the first one-way clutch.

According to the first aspect of the present invention, because the first one-way clutch engages and disengages both the second speed-changing element of the first planetary gear unit and the third brake, reverse rotation of the second speed-changing element is made possible by disengaging the first and third brakes. Such an arrangement enables, for example, six forward speed shifting. In addition, since one-way clutch shifting can be carried out using the first one-way clutch, a simple structure is achieved and controllability is improved.

Optionally, the first speed-changing element may be connected to a second one-way clutch, and the rotation of the input shaft transferred through a third clutch. With the first speed-changing element arranged in such a manner, reverse rotation is made possible by use of the second one-way clutch and the third clutch.

The first planetary gear unit may be a double-pinion planetary gear unit, wherein the first speed-changing element is a sun gear, the second speed-changing element is a carrier, the third speed-changing element is a ring gear, and at least 6 forward speed shift speeds can be achieved by the combination of the first and second planetary gear units.

Preferably, the first brake is arranged radially outward of the first planetary gear unit, the third brake is provided on the front side of and substantially axially aligned with the first brake, a third brake hydraulic actuator is provided on the front side of and axially aligned with the third brake, the first one-way clutch is provided on the front side of the first planetary gear unit, the second one-way clutch is provided on the front side of the first one-way clutch, and the first and second one-way clutches are positioned radially inward of the third brake and the third brake hydraulic actuator.

With the above-described structure spatial relationships of the components can be optimized. The first brake, the third brake and the third brake hydraulic actuator are substantially axially aligned in sequence from the rear side, radially outward of the first planetary gear unit. The first planetary gear unit, the first one-way clutch and the second one-way clutch are axially aligned in sequence from the rear side, radially inward of the first and third brakes and third brake actuator. In other words, the first and third brakes, the second brake hydraulic actuator, the first planetary gear unit, and the first and second one-way clutches can be provided with good spatial efficiency, both radially and axially, thus making the automatic transmission more compact.

Thus, the automatic transmission according to the present invention may be structured such that, in the first forward speed stage beyond (for example 5th speed) a directly connected stage (for example 4th speed), the first brake is engaged and the carrier of the first planetary gear unit is thereby stopped, and, upon shifting to a second higher speed stage (for example 6th speed) above the directly connected stage, the first and third brakes are disengaged, and the second one-way clutch is freed and permits reverse rotation of the carrier of the first planetary gear unit.

Therefore, the first one-way clutch may be arranged so as to be connected to the transmission case via the third brake, instead of being directly connected to the transmission case. The first one-way clutch, therefore, can function as a one-way clutch when the third brake is engaged, i.e. permitting forward rotation of the first planetary gear unit carrier and preventing reverse rotation of the same. At the same time, since the first one-way clutch is in a free state when the third brake is disengaged (a state identical to that where no one-way clutch is present), the first planetary gear unit carrier is permitted to rotate in either the forward or reverse direction and six forward speeds are enabled based on the enabling of reverse rotation of the first planetary gear unit carrier.

BRIEF DESCRIPTION OF THE DRAWINGS

FIG. 6 is a table of operations for the multi-speed speed change mechanism of the first embodiment;

FIG. 10 is a table of operations for the multi-speed speed change mechanism according to the second embodiment;

DETAILED DESCRIPTION OF PREFERRED EMBODIMENTS

First Embodiment

Figure 1:
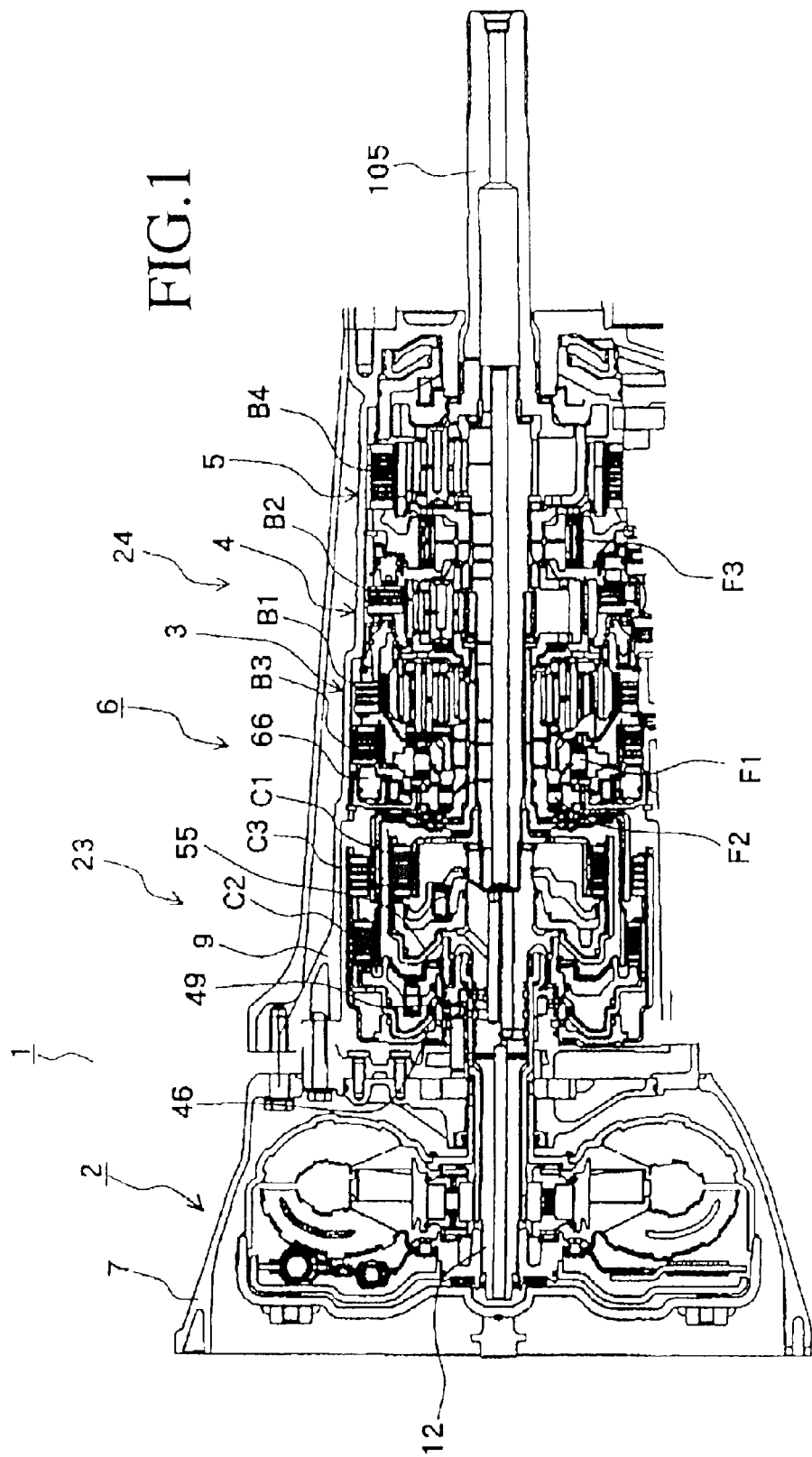
FIG. 1 is a cross-sectional view of an entire automatic transmission according to a first embodiment of the present invention.
Figure 2:
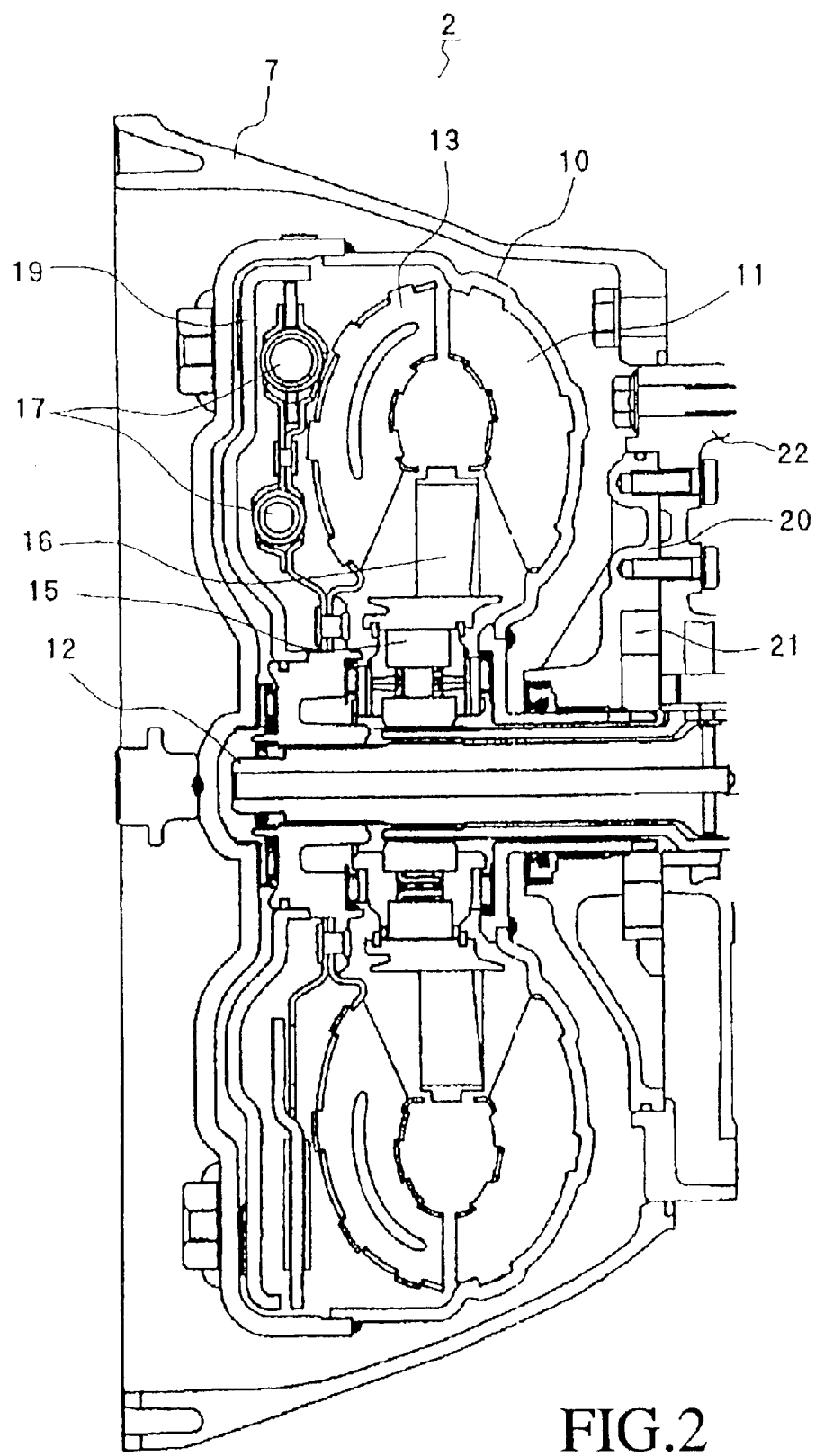
FIG. 2 is an enlarged cross-sectional view of a part of the torque converter of the first embodiment.
Figure 3:
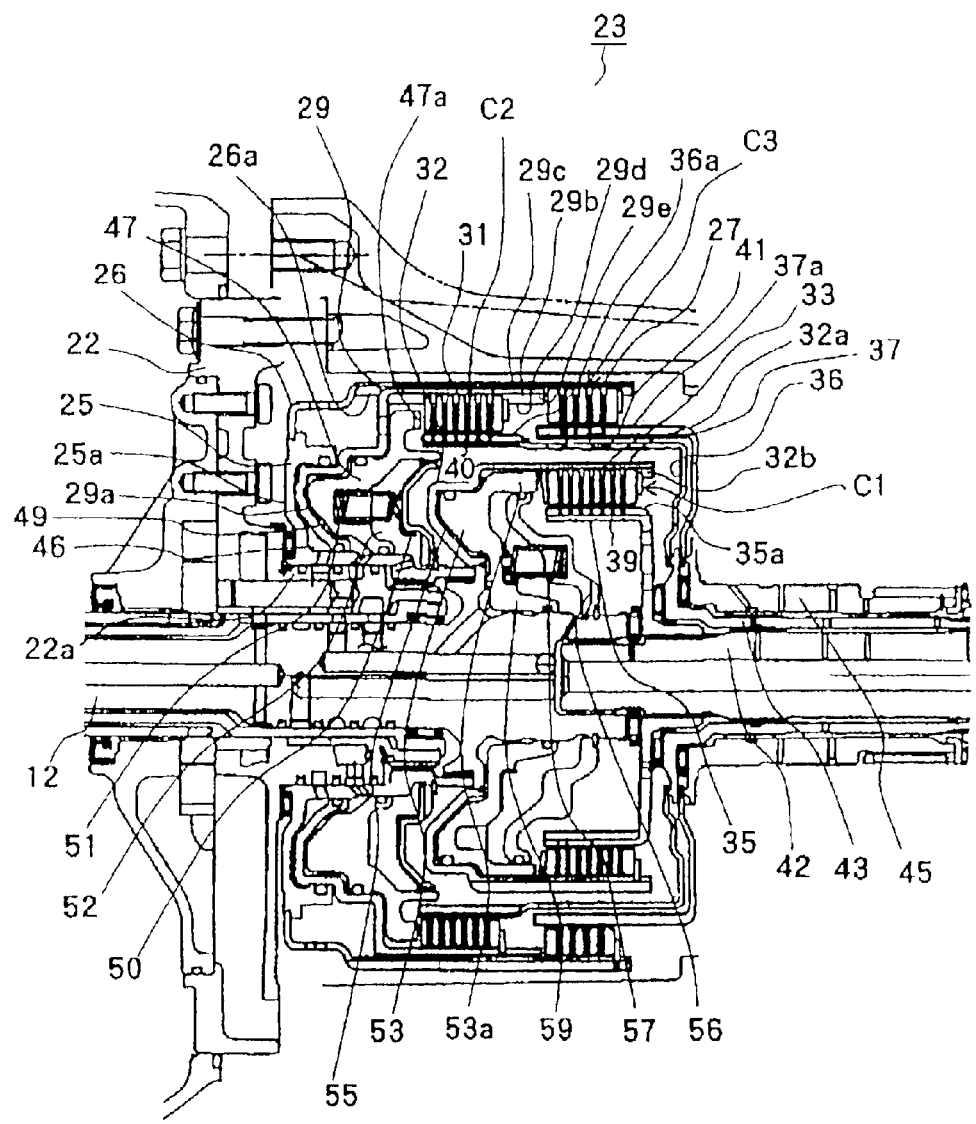
FIG. 3 is an enlarged cross-sectional view of a clutch section located in a front portion of a multi-speed speed change mechanism according to the first embodiment.
Figure 4:
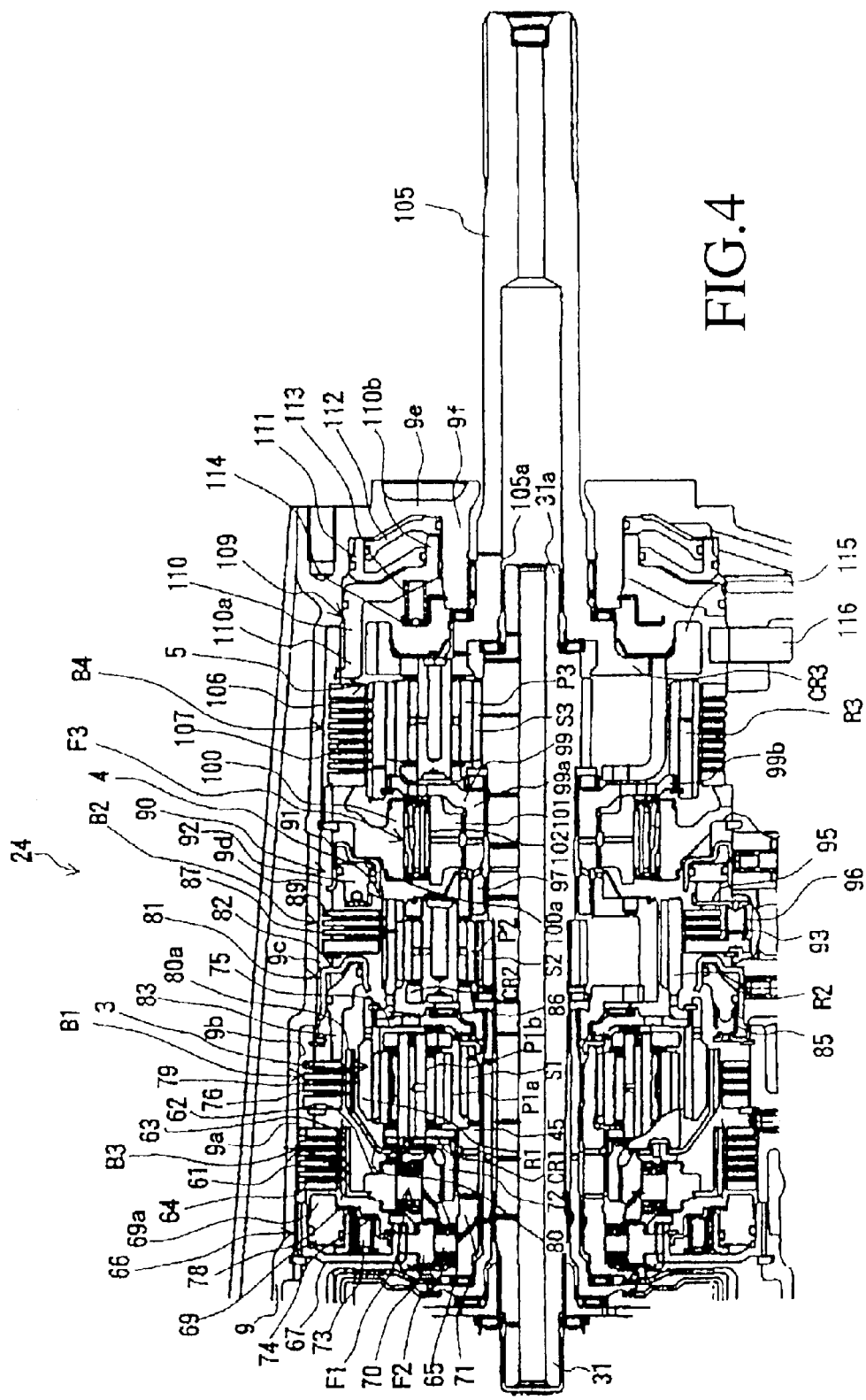
FIG. 4 is an enlarged cross-sectional view of a gear section located in a rear portion of the multi-speed speed change mechanism according to the first embodiment.

FIG. 1 is an overall cross-sectional view of an automatic transmission according to a first embodiment of the present invention, and FIGS. 2, 3 and 4 are enlarged cross-sectional views of portions thereof. In the description which follows, the left side of FIGS. 1 to 4 is referred to as the "front side" ("front" or "input side") and the right side is referred to as the "rear side" ("back side", "rear" or "output side").

As shown in FIG. 1, an automatic transmission 1 includes a multi-speed speed change mechanism 6 having a torque converter 2, three planetary gear units (a first planetary gear unit 3, a second planetary gear unit 4 and a third planetary gear unit 5). The torque converter 2 and the multi-speed speed change mechanism 6 are aligned in series on the same one shaft and are housed in a case including a converter housing 7 and a transmission case 9. Note that the second and third planetary gear units 4 and 5 are included in which is referred to herein as a "planetary gear set."

As shown in detail in FIG. 2, the torque converter 2 includes a pump impeller 11, which is provided on a cover 10 that is connected to an engine output shaft (not shown in diagram), a turbine runner 13 that connects with an input shaft 12 of the multi-speed speed change mechanism 6, and a stator 16 that is supported via a one-way clutch 15. Moreover, the torque converter 2 includes a lock-up clutch 19 that is mechanically connected to the cover 10 and the input shaft 12 via a spring damper 17. In addition, a pump case 20 is fixed between the converter housing 7 and the transmission case 9 (see FIG. 1). The pump case 20, in cooperation with a pump cover 22, houses oil pump 21. The cover 10 is rotatably supported by the pump case 20. The pump cover 22 is fixed on a rear side of the pump case 20, and an inner race of the one-way clutch 15 is fixed to the pump cover 22. Oil passages are formed in the pump cover 22.

As shown in FIG. 1, the front half portion, or front side, (torque converter 20 side) of the multi-speed speed change mechanism 6 includes a clutch section 23, and the rear half portion, or back side, (output shaft side) includes a gear section 24.

Three clutches, i.e. a first clutch C1, a second clutch C2 and a third clutch C3, are operated, respectively, by hydraulic actuators 55, 49 and 46 (described below) located in the clutch section 23. Of the three clutches, the second clutch C2 and the third clutch C3 are provided on a radially outer side, with the second clutch C2 on the front side and the third clutch C3 on the back side. In other words, the second clutch C2 and the third clutch C3 are provided so as to be substantially axially aligned so that, on the radially outer side, a back side of the second clutch C2 and a front side of the third clutch C3 are in opposition. The first clutch C1 is provided on a radially inner side of the second clutch C2 and the third clutch C3. The first clutch C1 does not axially overlap the second clutch C2, and is located radially inward of the third clutch C3.

The clutch 23 will now be explained in more detail with reference to FIG. 3 (an expanded view of the clutch section 23 shown in FIG. 1).

The first, second and third clutches C1, C2 and C3 are rotatably supported on an outer peripheral surface of a boss 22a of the pump cover 22, for transfer of rotation received from a sleeve 25 that is connected to the input shaft 12 (an input member). The front portion of the sleeve 25 has a flange 25a, and a third drum 26 (a clutch drum) is fixed to an outer peripheral portion of the flange 25a. A spline 26a is formed on an inner peripheral surface of the third drum 26 and a plurality of drive plates 27 (outer friction plates) of the third clutch C3, and a second drum 29 (a clutch drum) are engaged on the spline 26a such that the second and third drums 29 and 26 rotate together as an integral unit.

A flange portion 29a extends radially inward from one end of a cylindrical portion 29b of the second drum 29 and is supported by the sleeve 25 in a manner allowing axial movement with an oil-tight seal therebetween. A spline 29c is axially formed on the outer surface of cylindrical portion 29b of the second drum 29. The second drum 29 is engaged with the splines 26a of the third drum 26 through splines 29d formed on its inner cylindrical surface. A plurality of drive plates 31 (outer friction plates) of the second clutch C2 are engaged with the splines 29d. In addition, a first drum 32 (a clutch drum), fixed to the input shaft 12, is provided radially inward of the second and third clutches C2 and C3. Splines 32b are formed on the inner surface of a drum cylindrical portion 32a. A plurality of drive plates 33 (outer friction plates) of the first clutch C1 are engaged with the splines 32b.

A second hub 36 and a third hub 37 are sequentially arranged radially outward from a first hub 35. Splines 35a, 36a and 37a are formed on outer cylindrical surfaces of the first, second and third hubs 35, 36, and 37, respectively. Furthermore, a plurality of driven discs 39 (inner friction plates) of the first clutch C1, a plurality of driven discs 40 (inner friction plates) of the second clutch C2 and a plurality of driven discs 41 (inner friction plates) of the third clutch C3 are engaged with the splines 35a of the first hub 35, the splines 36a of the second hub 36 and the splines 37a of the third hub 37, respectively. The first hub 35, the second hub 36 and the third hub 37 are respectively connected and fixed to an intermediate ("central") shaft 42, a second sleeve shaft 43 that is over the central shaft 42 and a third sleeve shaft 45 that is fitted over the second sleeve shaft 43. In other words, the second sleeve shaft 43 and the third sleeve shaft 45 are rotatably supported on the same shaft (intermediate or central shaft 42) and are respectively spaced by a bush or the like.

The flange portion 29a of the second drum 29 is fitted in a sleeve 25 in an oil-tight fashion to form the third clutch hydraulic actuator 46 in cooperation with the flange portion 25a of the sleeve 25. An end portion 29e of the second drum 29, which is extended axially beyond the engagement surface of the second clutch C2, opposes the third clutch C3 and serves as a portion of a piston for the third clutch. A second piston 47 is fitted in an oil-tight fashion within the flange portion 29a of the second drum 29 to form the second clutch hydraulic actuator 49. An end portion 47a at the outer periphery of the second piston 47 opposes the second clutch C2. A cancel plate 50, the axial movement of which is limited by a snap ring fitted on the sleeve 25, opposes a back surface (axially rear side) of the second piston 47 with a return spring 51 interposed therebetween. A cancel chamber 52, that cancels the centrifugal hydraulic pressure of the third and second clutch hydraulic actuators 46 and 49, is formed between the cancel plate 50 and the back side of the second piston 47.

The first drum 32 is located at the axially rear side of the cancel plate 50. A first piston 53 is fitted oil-tight in first drum 32 to form the first clutch hydraulic actuator 55. An end portion 53a of the first piston 53 opposes the first clutch C1. Additionally, a cancel plate 56, the axial movement of which is limited by a snap ring fitted on the input shaft 12, is opposed to the back surface (axially rear side) of the first piston 53 to form a cancel chamber 59 therebetween. A return spring 57 is provided in the cancel chamber 59. The pressure within the cancel chamber serves to offset or cancel the centrifugal hydraulic pressure of the hydraulic actuator 55.

The third drum 26 is fitted around the outer peripheral cylindrical surface of the second drum 29 and extends axially from the second drum 29 for a predetermined length. Therefore, the third clutch C3 and the second clutch C2, fitted within the third drum 26 and the second drum 29, respectively, are substantially axially aligned. The third clutch C3 is positioned so that the drive plates 27 are positioned substantially radially outward of the second clutch C2, separated only by the plate thickness of the second drum 26.

The first clutch C1 is positioned radially inward of the second and third clutches C2 and C3, and a large portion of the cancel chamber 59 of the first clutch hydraulic actuator 55 is provided on the inner side of the first clutch C1. The first clutch C1 is provided radially inward of the second and third clutches C2 and C3 so as to operate independently of the second and third clutches C2 and C3.

Gear Section 24

As shown in FIG. 1, the gear section 24 is provided in the rear half portion of the multi-speed speed change mechanism 6, i.e., to the rear of the clutch section 23. The three planetary gear units (the first planetary gear unit 3, the second planetary gear unit 4, and the third planetary gear unit 5) are provided together with first to fifth braking mechanisms. The first braking mechanism is formed of a first brake B1, the second braking mechanism is formed of a second brake B2, the third braking mechanism includes a third brake B3 and a first one-way clutch F1, the fourth braking mechanism includes a fourth brake B4 and a third one-way clutch F3, and the fifth braking mechanism is provided in the form of a second one-way clutch F2.

As shown in detail in FIG. 4, the gear section 24 is structured with the first planetary gear unit 3 having a sun gear S1 (a first speed-changing element) formed on the third sleeve shaft 45, the second planetary gear unit 4 having a carrier CR2 connected to the second sleeve shaft 43 and the third planetary gear unit 5 having a sun gear S3 formed on the intermediate shaft 31 and arranged in sequence from the front (the input member 12 side). The third brake B3, the first one-way clutch F1 and the second one-way clutch F2 are arranged axially intermediate the clutch section 23 and the first planetary gear unit 3. Furthermore, the third one-way clutch F3 is arranged axially intermediate the second planetary gear unit 4 and the third planetary gear unit 5.

The third brake B3 is a multi-plate brake having a plurality of outer brake plates 61 engaged with splines 9a formed on the transmission case 9 and a plurality of inner brake discs 64 splined to a hub 63 that is fixed to outer race 62 of the first one-way clutch F1. An inner race 65 of the one-way clutch F1 is formed integrally with a carrier CR1 (a second speed-changing element) of the first planetary gear unit 3. The third brake B3 and the first one-way clutch F1 axially overlap in radially spaced positions, the third brake B3 being positioned radially outward of the one-way clutch F1.

A third brake hydraulic actuator 66 is provided axially to the front side of the third brake B3 and consists of a cylinder 67 and a piston 69. The cylinder 67 is connected to the transmission case 9 so as to be fixed against both axial and rotational movement. The piston 69 is fitted oil-tight within the cylinder member 67, and a rear end portion 69a of the piston 69 opposes the third brake B3. In addition, outer race 70 of the second one-way clutch F2 is splined to the inner surface of the cylinder member 67. Inner race 71 of the second one-way clutch F2 is formed of the third sleeve shaft itself. Furthermore, the third brake hydraulic actuator 66 and the second one-way clutch F2 are arranged so as to substantially axially overlap (i.e. at least one portion overlaps) in radially spaced positions. A return spring 73 is located radially intermediate the piston 69 and outer side of the second one-way clutch F2 and serves to return the piston 69. Note that the piston 69 is relatively short (relative to the other pistons) and has no extended portion, whereas a piston 83, described below, has an extended portion that extends toward brake B1 with a return spring 85 provided between comb-like teeth. The return spring 73 is held on an inner side of the piston 69 by a supporting member 74, and is connected to the piston 69 by a connecting member 78.

The positional relationships of the third brake B3, and the hydraulic actuator 66 and the first and second one-way clutches F1 and F2 will now be described. The hydraulic actuator 6C and the third brake B3 are located radially outward with the hydraulic actuator 66 on the front side and the third brake B3 on the rear side. Substantially the whole first and second one-way clutches F1 and F2 are mounted in a space that is formed between the hydraulic actuator 66, the inner side of the third brake B3, and the outer side of the third sleeve shaft 45. In this way, as will be described below, six forward speed shift speeds are enabled, while at the same time the third brake B3, the hydraulic actuator 66 and the first and second one-way clutches F1 and F2 are compactly arranged.

The first planetary gear unit 3 is a dual planetary gear unit (see FIG. 5), having a pinion P1*a* that meshes with the sun gear S1 and a pinion P1*b* that meshes with a ring gear R1 (a third speed-changing element). The carrier CR1 that supports the mutually meshing pinions P1*a* and P1*b* is rotatably supported on the third sleeve shaft 45 through a boss portion 72, and the sun gear S1 is integrally formed with the third sleeve shaft 45. The ring gear R1 is rotatably supported with its axial direction fixed by a plate 75 that is splined to the rear end of the ring gear R1, and is also splined to ring gear R2 of the second planetary gear unit 4. The carrier CR1 of the first planetary gear unit 3 is, as described above, integrally formed with the inner race 65 of the first one-way clutch F1. Therefore, the carrier CR1 is rotatably supported by the third sleeve shaft 45 and, is connected to the transmission case 9 by the third brake B3 through the first one-way clutch F1. In addition, the carrier CR1 may be braked by direct connection to the transmission case 9 by engagement of the first brake B1.

The first brake B1 is also a multi-plate brake and includes a plurality of outer brake plates 76 engaged with splines 9*b* (formed continuous with the splines 9*a*) on the transmission case 9, with forward movement thereof limited. First brake inner brake discs 79 are engaged with splines formed on the outer cylindrical surface of a cup-shaped member 80 that is a part of the carrier CR1. The cup-shaped member 80 has an outer flat surface 80*a* which is extended to cover the outer side of the first planetary gear unit 3. The first brake B1, which is engaged with splines formed on the outer side of flat surface 80*a*, substantially axially overlaps the first planetary gear unit 3. Thus, the first brake B1 is sized to fit within the third planetary gear unit 3.

A first brake hydraulic actuator 81 is provided on the rear side of the first brake B1. The hydraulic actuator 81 includes a cylinder member 82 and the piston 83. The cylinder member 82 is fixed to a stepped minor diameter portion 9*c* of the transmission case 9, and the piston 83 is fitted oil-tight within the cylinder member 82. The hydraulic actuator 81 axially straddles the radially outer side of the first and second planetary gear units 3 and 4. In other words, the first brake B1 that brakes a rotating element (CR1) of the first planetary gear unit and its hydraulic actuator 81 are mounted so that at least one portion thereof axially overlaps the outer side of the first planetary gear unit 3. The piston 83 has comb-like teeth extending towards the first brake B1, and the return spring 85 is mounted between the comb-like teeth.

The second planetary gear unit 4 is a simple planetary gear unit and includes carrier CR2 which supports a pinion P2 and is splined with the second sleeve shaft 43. A sun gear S2 is splined to the intermediate shaft 31 and the ring gear S2 is splined to the ring gear R1 of the first planetary gear unit 3. The second planetary gear unit 4 has a diameter smaller than that of the first planetary gear unit 3 which is a dual planetary gear unit. Therefore, a flange portion 86 that extends radially outward is formed on a front end of the ring gear R2. The outer periphery portion of the flange portion 86 and the plate 75 are integrally connected to an inner surface of the ring gear R1. The first brake hydraulic actuator 81, excluding the piston extension, is provided together with the second brake B2 radially outward of the second planetary gear unit 4 that has a smaller diameter. Therefore, the hydraulic actuator 81 is provided with the predetermined required pressure-receiving area, despite the transmission case 9 having a smaller diameter, due to the stepped minor diameter portion 9*c*, and has a torque capacity corresponding to the torque capacity required of the first brake B1.

The second brake B2 is located on the rear side of the first brake hydraulic actuator 81 and is a multi-plate brake. A plurality of outer brake plates 87 are engaged with splines 9*d* of the transmission case 9 located in the minor diameter portion described above. Inner brake discs 89 are engaged with splines formed on the outer peripheral surface of the ring gear R2. The second brake B2 is provided on the radially outer side of the second planetary gear unit 4 so as to axially overlap the second planetary gear unit 4. More specifically, the second brake B2 is sized to fit within the second planetary gear unit 4.

A second brake hydraulic actuator 90 is provided on the rear side of the second brake B2 and includes a cylinder member 91 and a piston 92. The cylinder member 91 is fixed to the inner peripheral surface of the transmission case 9, and the piston 92 is mounted oil-tight within the cylinder member 91. The piston 92 has a relatively short length, whereas the piston 83 includes a portion that extends toward a brake with the return spring 85 provided between its comb-like teeth. The hydraulic actuator 90 is provided on a rear side of the second brake B2 such that one portion of either overlaps a rear end portion of the second planetary gear unit 4, or such that an end portion of the piston 92 is substantially in alignment. The outer edges of the outer brake plates 87 and the inner brake discs 89 of the second brake B2 have notches 93 at a predetermined interval. A return spring 96 is provided between a support plate 95, depending from an end portion of the piston 92, and a fixed member such as the transmission case 9.

The third one-way clutch F3 is provided on the rear side of the hydraulic actuator 90 of the second brake B2, i.e. in a space between the second planetary gear unit 4 and the third planetary gear unit 5. A rear carrier plate 97 of the second planetary gear unit 4, and a ring gear R3 of the third planetary gear unit 5 are connected by a connecting member 99. The third one-way clutch F3 has an outer race 100 that forms a fixed side and an inner race 101 that forms a movable side. The outer peripheral surface of the outer race 100 is splined to the transmission case 9, and an inner peripheral surface of the inner race 101 is splined with a boss portion 99*a* of the connecting member 99.

The width of the outer race 100 that opposes the engagement member 102, such as a roller, a sprag or the like, conforms to the width of engagement member 102 and narrows radially outward so as to provide a taper extending from both the front and rear ends thereof and, on the rear side, extends as a flange. Thus, the outer race 100 extends radially outward from that engaging surface conforming to engagement member 102, which engaging surface is comparatively axially long, through the tapered flange-shaped extended portion, to engagement with the transmission case 9 along a predetermined axial direction length, which is also comparatively long, to provide the outer race 100 with a predetermined torque capacity. The taper of the flange-shaped extended portion forms a relatively axially shorter waist where, on the front side thereof, a concave portion 100a receives a rear portion of the second brake hydraulic actuator 90 to allow the transmission to be axially shortened while providing the necessary torque capacity. In other words, the axially short waist of the extended portion with concave portion 100a enables a second brake mechanism, that includes the hydraulic actuator 90, to be provided on the radially outer side with at least one portion overlapping axially, thereby enabling the axial length of the automatic transmission as a whole to be shortened. Thus, the hydraulic actuator 90 is provided in the space between the second planetary gear unit 4 and the third one-way clutch F3, and has a compact structure.

Conversely, the width of the inner race 101 conforms to the width of the engagement member 102, and narrows towards its radially inner side so as to provide a taper. In the same manner as described above, the inner race 101 provides a torque capacity corresponding to the area of its engaging surface, and provides a splined inner surface extending from the connecting member 99 to the rear carrier plate 97.

The third planetary gear unit 5 is provided on the rear side of the third one-way clutch F3, and is a simple planetary gear unit. The ring gear R3 is connected to the outer periphery of flange 99b of the connecting member 99 and is also connected to the carrier CR2. The sun gear S3 is integrally formed with the intermediate shaft 31, at a rear end portion of the intermediate shaft 31. Carrier CR3 supports a pinion P3 which is integrally formed on an output shaft 105. The intermediate shaft 31 has a stepped structure, with the sun gear S3 formed as its largest diameter portion and its diameter becoming sequentially smaller in the forward direction. The output shaft 105 is widened into a flange shape which serves as the carrier CR3. A rear end protruding portion 31a of the intermediate shaft 31 is engaged with a front end hollow portion 105a of the output shaft 105 whereby the output shaft 105 is rotatably supported while held against axial movement. Thus, the intermediate shaft 31 has its ends indirectly supported by the transmission case through the input shaft 12 and the output shaft 105, respectively. The front end portion of the output shaft 105, in turn, is indirectly supported within a boss portion 9f extending from the rear end 9e of the transmission case 9 through a bearing. Further, a rear portion of the output shaft 105 is directly supported by a rear extension of the transmission case 9 (not shown in drawing FIGS.), through a bearing.

The fourth brake B4, a multi-plate brake, is provided on the rear side of the third one-way clutch F3. A plurality of outer brake plates 106 are engaged with the splines 9d on the inner peripheral surface of the transmission case 9, along with the outer race 100 of the third one-way clutch F3. Axial movement of the fourth brake B4 is limited by a snap ring (not shown). Inner brake discs 107 are engaged with splines formed on an outer peripheral surface of the ring gear R3. The fourth brake B4 is located on the radially outer side of the third planetary gear unit 5, so as to substantially axially overlap (i.e. at least one portion overlaps) the third planetary gear unit 5.

A fourth brake hydraulic actuator 109 is a double piston type actuator provided on a rear side of the fourth brake B4 and the third planetary gear unit 5. The rear side 9e and the flange portion 9f of the transmission case 9 form the cylinder of the fourth brake hydraulic actuator 109. The fourth brake hydraulic actuator further includes first piston 110, an intermediate supporting member 111 and a second piston 112. The first piston 110 is fitted oil-tight within the cylinder and has an extended portion 110a on its radially outer side that protrudes forward, and a hub portion 110b on its radially inner side that protrudes rearward. The extended portion 110a is engaged with the inner splines 9d and opposes the fourth brake B4.

The radially inner edge of the intermediate supporting member 111 mates oil-tight with the hub portion 110b. The radially outer edge mates oil-tight with the inner surface of the rear portion 9c of the transmission case 9. The radially outer edge of the second piston 112 contacts the inner peripheral surface of a rearward extending portion of intermediate supporting member 111 and the inner peripheral edge of second piston 112 fits in an oil-tight manner over the boss 9f and bears against the hub portion 110b of the first piston 110. A return spring 113 is provided between the first piston 110 and a supporting plate 114 provided on the flange portion 9f of the transmission case 9.

Therefore, the fourth brake hydraulic actuator 109 has a large pressure-receiving area, utilizing the rear end surface of the transmission case 9, and has an even larger pressure-receiving area due to having double pistons, i.e. first and second pistons 110 and 112. The fourth brake hydraulic actuator 109 can also exert a large engaging force corresponding to the set torque capacity of the fourth brake B4. A parking gear 115 is formed integrally with the outer periphery of the carrier CR3, and the output shaft 105 is fixed by engaging the parking gear 115, by use of a parking pole 116 that passes through the transmission case 9. Furthermore, the first piston 110 of the fourth brake hydraulic actuator 109 extends over the parking gear 115, and has a notch through which the parking pole 116 may be extended to engage the parking gear 115. The first piston 110 is provided to the rear and radially outward of the third planetary gear unit 5, slightly axially overlapping same.

Figure 5:
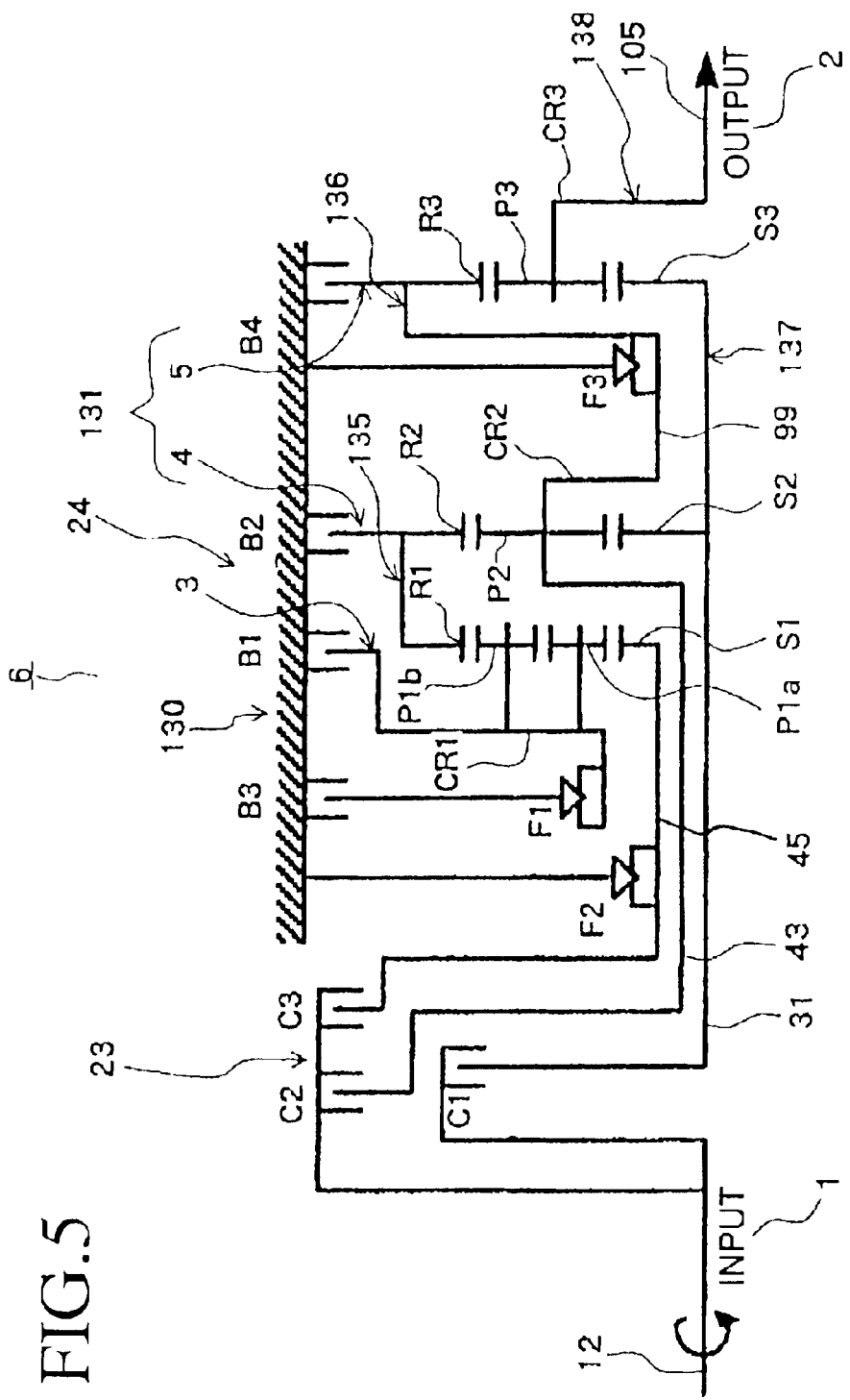
FIG. 5 is a skeletal diagram of the multi-speed speed change mechanism according to the first embodiment.
Figure 7:
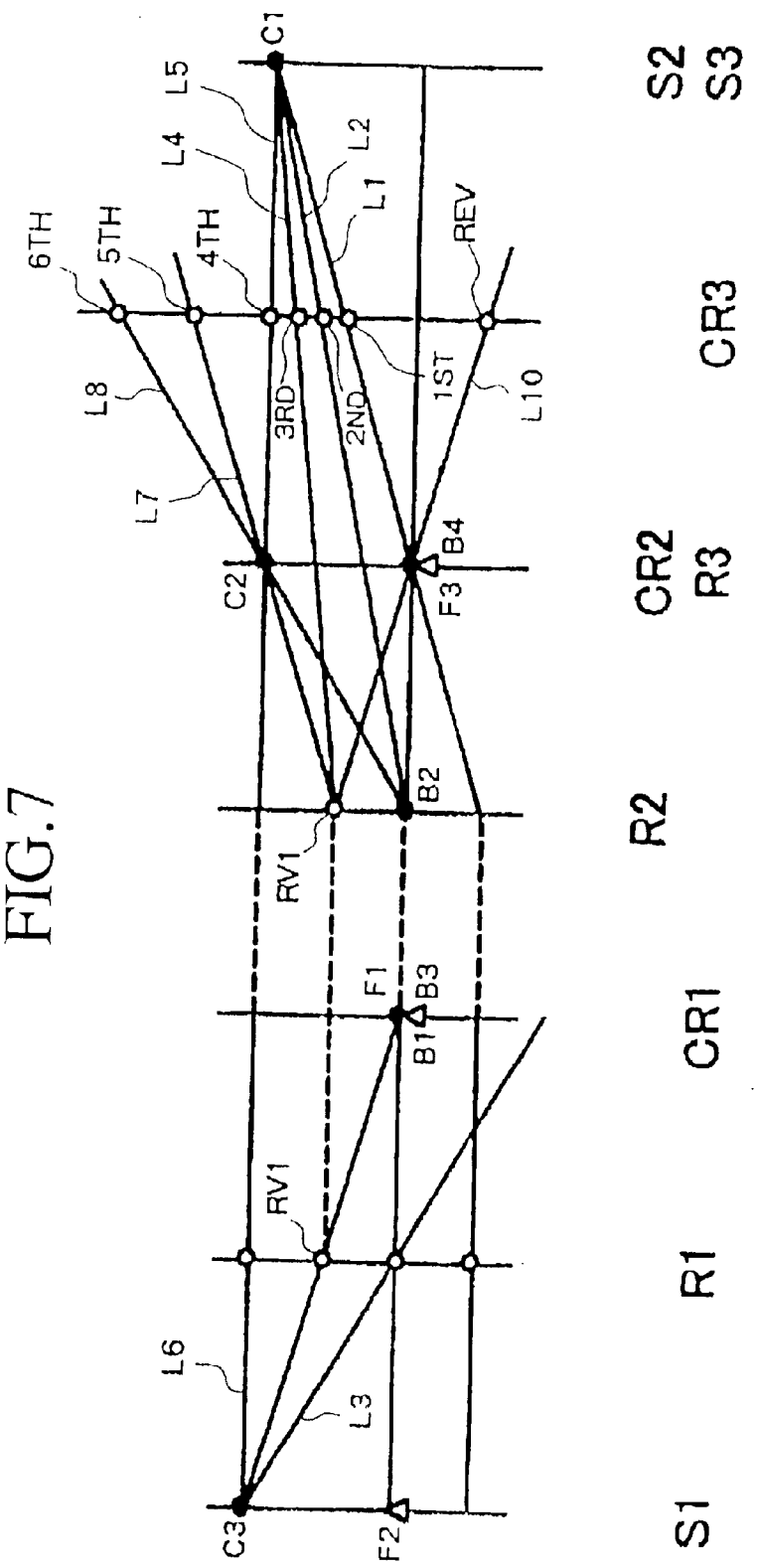
FIG. 7 is a velocity diagram for the multi-speed speed change mechanism according to the first embodiment.

Operation of the above-described multi-speed speed change mechanism will now be explained with reference to FIG. 5 which is a skeletal diagram of the multi-speed speed change mechanism 6 of the automatic transmission 1, to FIG. 6 which is a table of operations of the same, and to FIG. 7, a velocity diagram for the same.

Functionally, the multi-speed speed change mechanism 6 can be divided into a front gear unit 130 (the first gear unit) that includes the first planetary gear unit 3, and a rear gear unit 131 (the second gear unit) that includes the second planetary gear unit 4 and the third planetary gear unit 5. The rear gear unit 131 has a total of four rotating elements, a first rotating element 137 that includes both sun gears S2 and S3 connected through the intermediate shaft 31, a second rotating element 136 that includes the carrier CR2 and the ring gear R3 connected through the connecting member 99, a third rotating element 135 that includes the mutually connected ring gears R1 and R2, and a fourth (output) rotating element 138 that includes the carrier CR3 connected to the output shaft 105.

Further, the first rotating element 137 is connected through the intermediate shaft 31 to the first clutch C1 that is positioned on the radially inner side of the clutch section 23. The second rotating element 136 is connected through the second sleeve shaft 43 to the second clutch C2 that is positioned on the front and radially outer side of the clutch 23. The sun gear S1, which is an input element of the first planetary gear unit 3, is connected through the third sleeve shaft 45 to the third clutch C3 that is positioned to the rear and radially outward of the clutch section 23.

As shown in FIG. 6, in first speed (first speed: "1ST" in the table), the first clutch C1 is engaged, the third one-way clutch F3 is in operation and the input shaft 12 is engaged with the sun gears S2 and S3 (i.e. the first rotating element 137). Reverse rotation of the carrier CR2 and the ring gear R3 (i.e. the second rotating element 136) is stopped by the third one-way clutch F3 and rotation of the input shaft 12 (RIN) is input directly to the sun gear 53 of the third planetary gear unit 5 through the first clutch C1. The state shown by the line L1 in the velocity diagram FIG. 7 is achieved by stopping the ring gear R3 by operation of the third one-way clutch F3, with first speed forward rotation output from the carrier CR3 (i.e. the output rotational element 138) through the connected output shaft 105. In the second planetary gear unit 4, the sun gear S2 rotates but is in an idling state.

In the above manner, a large torque is generated in first speed and in vehicle start. This torque is supported by the third one-way clutch F3. As shown in FIG. 4, the third one-way clutch F3 is axially positioned between the second and third planetary gear units 4 and 5 in a comparatively long space, and the areas of the braking mechanism 102 (the roller or the sprag), of the outer race 100 and of the inner race 101 portions that contact it are particularly wide, reliably supporting the large torque. The first clutch C1 is independently operated by the first clutch hydraulic actuator 55 that is positioned on the radially inner side of the clutch section 23.

As shown in FIG. 6, in a second forward speed (second speed: 2ND in the 25 table), in addition to the engagement of the first clutch C1 that is engaged in first speed, the third brake B3 is engaged, the operation of the third one-way clutch F3 is disengaged and the first and second one-way clutches F1 and F2 are operative. In this state, the first planetary gear unit 3 is stopped because the carrier CR1 is stopped by the locked first one-way clutch F1, and the sun gear S1 is stopped by the second one-way clutch F2, which is braked by engagement of the third brake B3. Therefore, the ring gear R2 of the second planetary gear unit 4 that is connected to the ring gear R1 is also stopped.

Rotation of the input shaft 12 is input into the second planetary gear unit 4 from the sun gear S2 through the first clutch C1, and into the third planetary gear unit 5 through the sun gear S3. In the second planetary gear unit 4, rotation of the ring gear R2 is stopped (speed=0) in the manner described above, achieving the state shown by the line L2 in the velocity diagram of FIG. 7, and a second speed forward rotation is output from the carrier CR3 through the connected output shaft 105. In this state, rotational torque of the ring gear R2 is shared and supported by the third brake B3 through the first and second one-way clutches F1 and F2. By utilizing the torque support capacity of the first one-way clutch F1, the torque load capacity of the second one-way clutch F2 and the third brake B3 can be reduced by that amount, enabling a reduction in their capacity and size. Therefore, the third brake B3 and its hydraulic actuator 66, and the first and second one-way clutches F1 and F2 can be provided together in a compact arrangement in the front portion of the first planetary gear unit 3.

As shown in FIG. 6, in a third forward speed (third speed: 3RD in the table), in addition to the engagement of the first clutch C1 as in the first and second speeds, the third clutch C3 is engaged, engagement of the third brake B3 is maintained, the second one-way clutch F2 is inoperative and operation of the first one-way clutch F1 is maintained. In this state, the rotation of the input shaft 12 is also input to the sun gear S1 of the front gear unit 130 through the third clutch C3, in addition to that already input to the rear gear unit 131 through the first clutch C1, and the carrier CR1 is braked by the first one-way clutch F1. Thus, the first planetary gear unit 3 is in the state shown by the line L3 in the velocity diagram FIG. 7, because rotation of the input shaft 12 is input into the sun gear S1 and the carrier CR1 is braked. Forward rotation RV1 is output from the ring gear R1, serving as an output element of the front gear unit 130, to the ring gear R2 of the second planetary gear unit 4, serving as an input element of the rear gear unit 131. At the same time, in the rear gear unit 131, because the rotation RIN of the input shaft 2 is input into the sun gears S2 and S3, the rotation RV1 input into the ring gear R2 is combined as shown by line L4 in the velocity diagram FIG. 7, and third speed rotation is output from the carrier CR3 through the output shaft 105.

The third brake B3 and the first one-way clutch F1 bear the reaction of the torque transferred to the first planetary gear unit 3 but, in the third speed state, because the torque that is transferred via the first planetary gear unit 3 that is part of the front gear unit 130 and the torque that is directly transferred through the first clutch C1 in the rear gear unit 131 are combined, it is sufficient that the third brake B3 and the first one-way clutch F1 support only a portion of the entire transfer torque. Therefore, the third brake B3 and the first one-way clutch F1 can be smaller than previously possible with a smaller torque capacity, and can be located together with other braking mechanisms, i.e. the first one-way clutch F1 and the hydraulic actuator 66 of the third brake 133, in a comparatively small space to the front of the first planetary gear unit 3.

The third clutch C3 is engaged by movement of the second drum 29 axially to the rear, by supply of oil pressure to the hydraulic actuator 46, so that the end portion 29e presses the drive plates 27 and the driven discs 41 together. During engagement of the third clutch C3, the second clutch C2 that is splined to the second drum 29 remains disengaged and does not prevent the movement of the second drum 29. In other words, movement of the second drum 29 does not affect the second clutch C2.

As shown in FIG. 6, in a fourth forward speed (fourth speed: 4TH in the table), in addition to the engagement of the first clutch C1, also engaged in the first, second and third speeds, and engagement of the third clutch C3 in third speed, the second clutch C2 is engaged, and the first one-way clutch F1 is inoperative. In this state, the rotation of the input shaft 12 is also input to the carrier CR2 and the ring gear R3 through the second clutch C2, in addition to that already input to the sun gears S2 and S3 of the rear gear unit 131 through the first clutch C1. The whole of the rear gear unit 131, i.e. the second and third planetary gear units 4 and 5, is directly rotated to establish the state shown by the line L5 in FIG. 7, with fourth speed rotation output from the carrier CR3 through the connected output shaft 105. As shown in FIG. 6, the third clutch C3 and the third brake B3 are engaged. In the first planetary gear unit 3, however, while the rotation of the input shaft 12 is transferred to the sun gear S1 through the second clutch C2, because the second planetary gear unit 4 is rotating forward in a state directly connected with the input shaft 12, the rotation of the input shaft 12 is also input to the ring gear R1 that is connected to the ring gear R2 of the second planetary gear unit 4. The state of the first planetary unit 3 is therefore as shown by line L6 in FIG. 7, and the whole of the first planetary gear unit 3 that constitutes the front gear unit 130 idles in a directly connected state. In addition, in this fourth speed state, the front gear unit 130 and the rear gear unit 131 are both in a directly connected state, the brake and one-way clutch mechanisms are not operated, and do not support (bear) any reaction force.

The second clutch C2 moves the piston 47 axially to the rear by supply of oil pressure to the hydraulic actuator 49, and the rear end portion 47a of the piston 47 presses against the clutch plates 31 and the clutch discs 40. In the same way, the third clutch C3 is maintained engaged, and the second drum 29, which receives the reaction force of the piston 47, maintains its position and does not affect movement of the piston 47. In other words, the second drum 29 is maintained in the third clutch engagement position and does not affect engagement of the second clutch C2.

As shown in FIG. 6, in a fifth forward speed (fifth speed: 5TH in the table), the engagement of the first clutch C1 is released, the second and third clutches C2 and C3 are maintained engaged, and the first brake B1 is engaged. In this state, the rotation of the input shaft 12 is input to the carrier CR2 of the second planetary gear unit 4 and to the ring gear R3 of the third planetary gear unit 5 through the second clutch C2. The rotation of the input shaft 12 is also input through the third clutch C3 to the sun gear S1 of the first planetary gear unit 3. In this manner, because the carrier CR1 is braked by the first brake B1, the front gear unit 130 is in the state represented by the line L3 in FIG. 7, and the decelerated forward rotation RV1 is output from the ring gear R1 to the ring gear R2 of the rear gear unit 131. In the same way, because the rotation of the input shaft 12 is input into the carrier CR2 of the rear gear unit 131 and the ring gear R3, the state represented by the line L7 in FIG. 7 is established, and fifth speed rotation is output from the carrier CR3 through the output shaft 3. In this state, as shown in FIG. 6, the third brake B3 is engaged but, because the first one-way clutch F1 is in an idling state, the third brake B3 is not involved in shifting.

In fifth speed, the first brake B1 supports the reaction force of the transfer torque; however, a relatively small torque capacity is sufficient. Furthermore, because torque transferred via the second clutch C2 and torque transferred via the third clutch C3 combine in the rear gear unit 131 before transfer to the output shaft 105, it is sufficient that the torque capacity of the first brake B1 that brakes the carrier CR1 and the ring gear R1 be only a small portion of the whole transfer torque. Therefore, the first brake B1 can have a comparatively short axial length radially outward of the first planetary gear unit 3. Further, the hydraulic actuator 81 can also be provided radially outward of and straddling the adjacent first and second planetary gear units 3 and 4, and within a comparatively axially short and small space. Further, the third brake B3 and its hydraulic actuator 81 can be provided in a comparatively small space radially outward of the first planetary gear unit 3.

Additionally, the first clutch C1, moves the piston 53 axially forward by action of the return spring 57 and by releasing oil pressure of the hydraulic actuator 55 pressing the clutch plates 33 and the clutch discs 39. Because the first drum 32 rotates at a comparatively high speed, centrifugal force is applied even to oil in the cancel chamber 59, and therefore the oil pressure of the hydraulic actuator 55 is quickly drained.

As shown in FIG. 6, in a sixth forward speed (sixth speed: 6TH in the table), the second and third clutches C2 and C3 are maintained engaged, the first brake B1 is disengaged, the second brake B2 is engaged, and the third brake B3 is disengaged. In this state, the rotation of the input shaft 12 is input through the second clutch C2 to the carrier CR2 of the second planetary gear unit 4, and to the ring gear R3 of the third planetary gear unit 5. At the same time, because the ring gear R2 is braked by the second brake B2, the sun gears S2 and S3 rotate in a forward direction at a higher speed than in fifth speed. Sixth speed rotation is output by the carrier CR3 to the output shaft 105 through rotation of the ring gear R3 and the high speed rotation of the sun gear 53. This sixth speed corresponds to the line L8 in the velocity diagram FIG. 7. In this sixth speed, as shown in FIG. 6, the first and third brakes B1 and B3 are disengaged, and therefore are not involved in shifting at all. Furthermore, although the third clutch C3 remains engaged, it does not contribute to the shifting because the second one-way clutch F2 is inoperative and the carrier CR1 of the first planetary gear unit 3 is in a free state.

In addition, in sixth speed, the second brake B2 receives the reaction force of the transfer torque. While sixth speed is a high-speed state even faster than 5TH, a small torque capacity is sufficient for the second brake B2 and, accordingly, second brake B2 can have a comparatively short axial length and be located radially outward of the second planetary gear unit 4. Further, the hydraulic actuator 90 can be mounted in a comparatively small space on the front side of the third one-way clutch F3.

FIG. 6 shows that, in the above-described preferred embodiment, shifting from the first to the fourth speeds is carried out by use of a one-way clutch, and shifting from the fourth speed to the fifth speed, and from the fifth speed to the sixth speed, is carried out by clutch-to-brake shifting.

As described above, the first clutch C1 can be operated completely independently of the second and third clutches C2 and C3. In contrast, the second and third clutches C2 and C3 operate in a partially interlocked fashion. Therefore, it is problematical whether smooth down-shifts can be carried out when down shifting from the fourth speed to the third speed by disengaging only the second clutch C2 from a state where both the second and the third clutches C2 and C3 are engaged, and when down shifting from the third speed to the second speed by disengaging the third clutch C3 from the state where the second clutch C2 is already disengaged.

When down shifting from the fourth speed to the third speed, the oil pressure of the hydraulic actuator 49 is quickly released by the centrifugal force applied to oil in the cancel chamber 52. Furthermore, because the third clutch C3 remains engaged, the second drum 29 does not move. The second clutch C2 is not influenced by the third clutch C3, and the drive plates 31 and the driven discs 40 are disengaged.

When down shifting from the third speed to the second speed, the third clutch C3 is disengaged. In this event, however, the second clutch C2 is already disengaged, and the second piston 47 is in contact with a back surface of the second drum 29 due to action of the return spring 51. Oil pressure in the cancel chamber 52 is directly applied to the second drum 29, the oil pressure is cancelled, and the oil pressure of the hydraulic actuator 46 is quickly released by centrifugal force. In addition, because the second clutch C2 is already disengaged, the second drum 29 that serves in part as a piston is not influenced by the second clutch C2 and moves axially forward, thereby releasing the pressure on the drive plates 27 and the driven discs 41 of the third clutch C3.

In the above-described manner, the second and third clutches C2 and C3 operate smoothly, even in down shifting.

As shown in FIG. 6, in reverse (REV in the table), the third clutch C3 is engaged, and the third and fourth brakes B3 and B4 are engaged, and the first one-way clutch F1 is operative. In this state, the rotation of the input shaft 12 is input through the third clutch C3 to the sun gear S1 of the front gear unit 130. Because the carrier CR1 is braked by the first one-way clutch F1, the state represented by the line L3 in the velocity diagram of FIG. 7 is established, and the forward output rotation RV1 is output from the ring gear R1 to the ring gear R2 of the rear gear unit 131. Because the ring gear R3 and the carrier CR2 are braked by the fourth brake B4, the state by the line L10 in FIG. 7 is established in the rear gear unit 131, and reverse rotation is output from the carrier CR3 to the output shaft 3.

In reverse, a large decelerated torque is applied to the fourth brake B4 that brakes the ring gear R3 and the carrier CR2. Accordingly, the fourth brake B4 has a comparatively long axial dimension, substantially overlapping the third planetary gear unit 5 radially outward of the third planetary gear unit 5. Moreover, its hydraulic actuator 109 has both a comparatively large pressure-receiving area provided on the rear end 9e of the transmission case 9 and a double piston structure. Therefore, a large pressing force can be generated, and a large reaction force can be reliably supported.

As shown in FIG. 6, during engine braking (coasting), in addition to the usual operations for third speed and reverse, the first brake B1 is engaged and the carrier CR1 is braked, in second speed the second brake B2 is engaged and the ring gear R2 is braked, and in first speed the fourth brake B4 is engaged and the ring gear R3 is braked.

In addition, during engine braking in second speed, the second brake B2 is caused to operate in addition to engagement of the third brake B3 that is primarily used for engine braking. The braking of the ring gear R2 is both directly by the third brake B3 and indirectly by the second brake B2 that operates through the carrier CR1. The torque capacity and size of the third brake B3 can be reduced in accordance with the braking force applied by the second brake B2. The torque capacity required of the third brake B3 for engine braking in second speed is small, and it is sufficient that the third brake B3 have a comparatively small mounting space radially outward of the second planetary gear unit 4. Further, as described above, for second speed engine braking, a small torque capacity is sufficient for the third brake B3 because of operation in combination with the second brake B2. Therefore, secure and highly-reliable braking is achieved, even though the third brake B3 and its hydraulic actuator 90 are sized for mounting in a small space.

As described above, when the torque from the input shaft 12 is input to the second planetary gear unit 4, the torque from the sun gears S2 and S3 in second speed, the torque from the sun gears S1, S2 and S3 in third speed, the torque from the sun gears S2 and S3 in fourth speed, the torque from the sun gears S1 and S2 and the ring gear R3 in fifth speed, and the torque from the sun gears S2 and S3 and the ring gear R3 in sixth speed, respectively, is input to the front gear unit 130 and the rear gear unit 131. Thus, torque is not only input to the second planetary gear unit 4. Therefore, second planetary gear unit 4 can be made smaller in order to provide it with an optimum gear ratio, and can also be made smaller from the point of view of enhancing strength, because of division of the input torque as described above. The hydraulic actuator 81 can be provided radially outward of the smaller diameter second planetary gear unit 4, and the second planetary gear unit 4 can therefore be made more compact in its axial and radial dimensions, while having a torque capacity that can support the torque required of the first brake B1.

Furthermore, although it is preferable to make the first, second and third clutches C1, C2 and C3, that respectively transfer the input torque to the first, second and third planetary gear units 3, 4 and 5, with a large radial dimension in order to provide sufficient torque capacity, it is possible to reduce the diameters thereof and provide them in the stated order with progressively larger diameter toward the output shaft, since the clutch section 23 is provided on the torque converter 2 side of the multi-speed speed change mechanism 6. Thus, the first embodiment provides an automatic transmission with an overall form preferable for installation in a vehicle as a front engine, rear drive automatic transmission.

Second Embodiment

Figure 8:
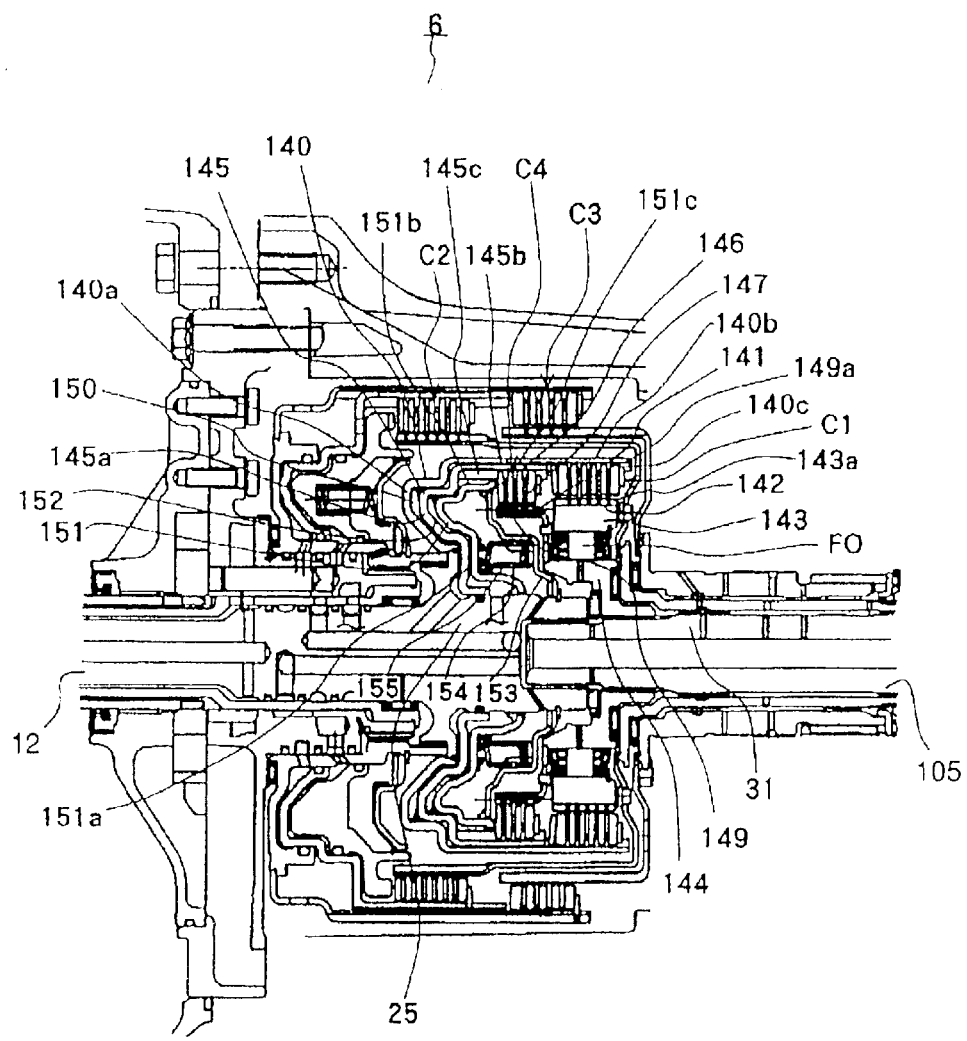
FIG. 8 is an enlarged cross-sectional view of a clutch section located in a front portion of a multi-speed speed change mechanism according to a second embodiment of the present invention.

FIG. 8 shows a second embodiment of the present invention and is an enlarged cross-sectional view of a clutch section of an automatic transmission which corresponds to FIG. 3 for the first embodiment, as described above. The following explanation mainly describes the elements and functions that are different from the first embodiment, and repeated description of identical portions has been omitted where appropriate.

This embodiment has a fourth clutch C4 provided on the front side of the first clutch C1, so as to be substantially axially aligned with the first clutch C1. Further, input side members of the first and fourth clutches C1 and C4 are integrated into a single element, an output side member of the fourth clutch C4 and the ring gears S2 and S3 of the second and third planetary gear units 4 and 5 are integrated and a fourth one-way clutch F0 is interposed between the output side member of the first clutch C1 and the output side member of the fourth clutch C4.

As shown in more detail in FIG. 8, according to this second embodiment, a first clutch drum 140 of first clutch C1 has a flange portion 140a and a cylindrical portion 140b. The inner periphery of the flange portion 140a is fixed to a rear end side of a sleeve 25 that is integral with the input shaft 12, and the cylindrical portion 140b extends toward the rear side from the outer periphery of the flange portion 140a. A spline 140c is formed on an inner surface of the cylindrical portion 140b, and a plurality of drive plates 141 (outer friction plates) of the first clutch C1 are engaged with a rear half portion of the spline 140c, so as to be axially movable. Driven discs 142 (inner friction plates) are engaged with splines 143a formed on an outer cylindrical surface of an outer race 143 of the fourth one-way clutch F0. The inner race 144 of the fourth one-way clutch F0 is splined to the outer surface of the intermediate shaft 31.

A fourth clutch drum 145 of the fourth clutch C4 is provided inside of the first clutch drum 140. The fourth clutch drum 145 has a flange portion 145a and a cylindrical portion 145b. An inner periphery of the flange portion 145a is fixed to the outer surface of the input shaft 12, and the drum portion 145b extends toward the rear side from the outer periphery of the flange portion 145a. A spline 145c is formed on the inner surface of the cylinder portion 145b, and a plurality of drive plates 146 of the fourth clutch C4 are engaged with the spline 145c, so as to be axially movable. Driven discs 147 that engage with and disengage from the drive plates 146 are engaged on a spline 149a that is formed on the outer surface of a fourth hub 149, so as to be axially movable.

Splines (not shown in Fig.) are formed on the outer surface of the cylinder portion 145b of the fourth clutch drum 145, and are engaged with the splines 140c of the cylinder portion 140b of the first clutch drum 140. An end 145d of the cylinder portion 145b is provided so as to face a front side of the first clutch C1. The whole of the fourth clutch drum 145 is supported by the first clutch drum 140 and the input shaft 12 so as to be axially movable. An oil-tight fourth hydraulic chamber 150 is formed between a front side of the flange portion 145a and a back side of the flange portion 140a of the first clutch drum 140. The fourth clutch drum 145, in addition to serving as the clutch drum of the fourth clutch C4, also serves as the piston of the first hydraulic actuator that engages and disengages the first clutch C1.

Fourth piston 151 of a fourth hydraulic actuator is provided inside the fourth clutch drum 145. The fourth piston 151 has a flange portion 151a and a cylinder portion 151b, and is supported by the fourth clutch drum 145 and the outer surface of the input shaft 12 so as to be axially movable. An end 151c of the cylinder portion 151b opposes the front side of the fourth clutch C4, and an oil-tight fourth hydraulic chamber 152 is formed between the front side of the flange portion 151a and the back side of the flange portion 145a of the fourth clutch drum 145.

A fourth cancel plate 153 has its inner periphery fixed to the outer surface of the input shaft 12, to the rear of the fourth piston 151. A return spring 154 is provided between the front side of the fourth cancel plate 153 and the back side of the fourth piston 151 which together form a fourth cancel chamber 155.

Operation of the multi-speed speed change mechanism 6 of the second embodiment will now be described with reference to FIG. 9, a skeletal diagram of the multi-speed speed change mechanism 6 and FIG. 10, a table of operations for same. Operations other than those of the first and fourth clutches C1 and C4, and the fourth one-way clutch F0 are identical to those described above in connection with the first embodiment, and therefore repetition of description will be omitted where appropriate. Accordingly, mainly the operation of the first and fourth clutches C1 and C4, and the fourth one-way clutch F0 will be described.

Figure 9:
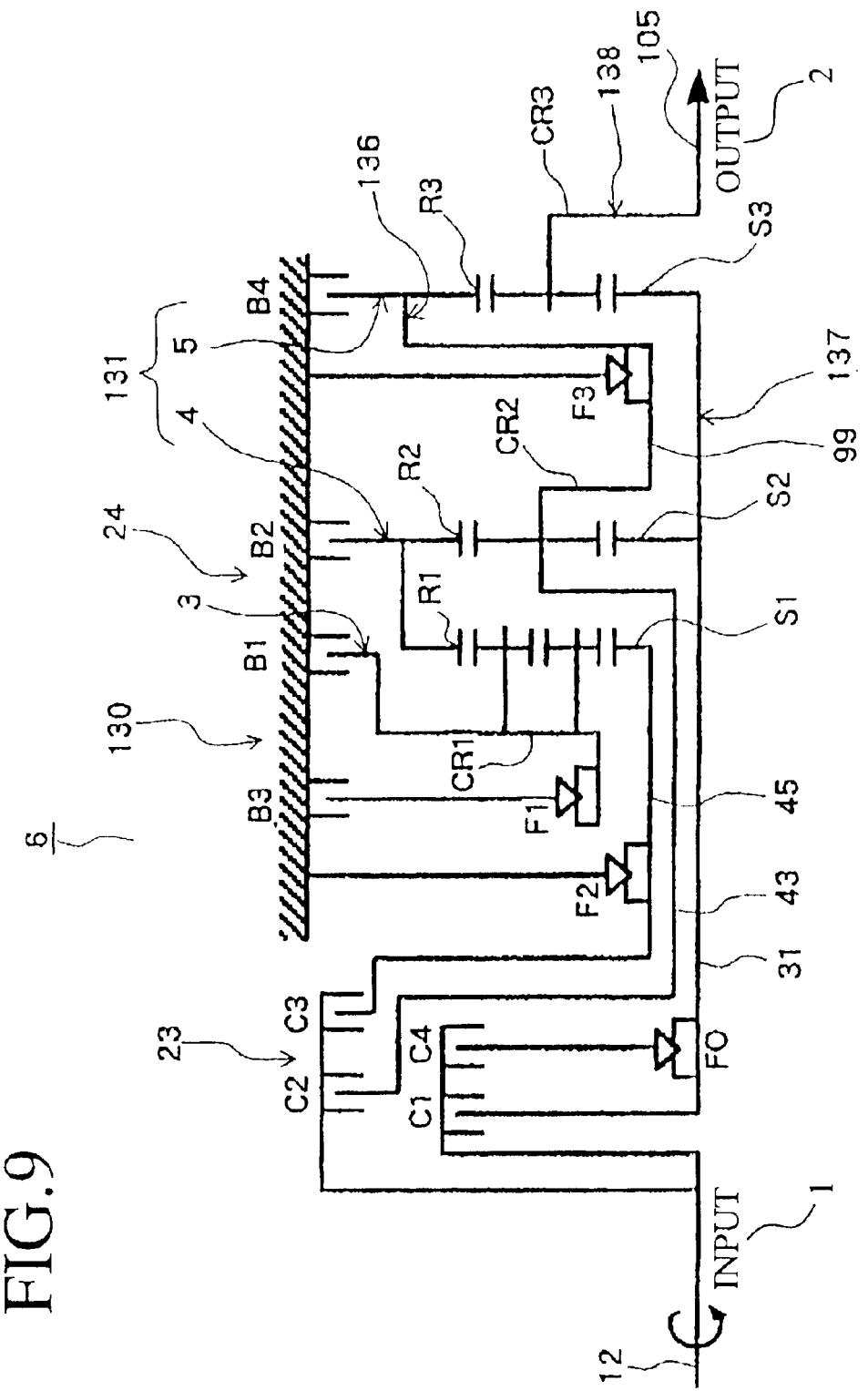
FIG. 9 is a skeletal diagram of the multi-speed speed change mechanism of the second embodiment.
Figure 11:
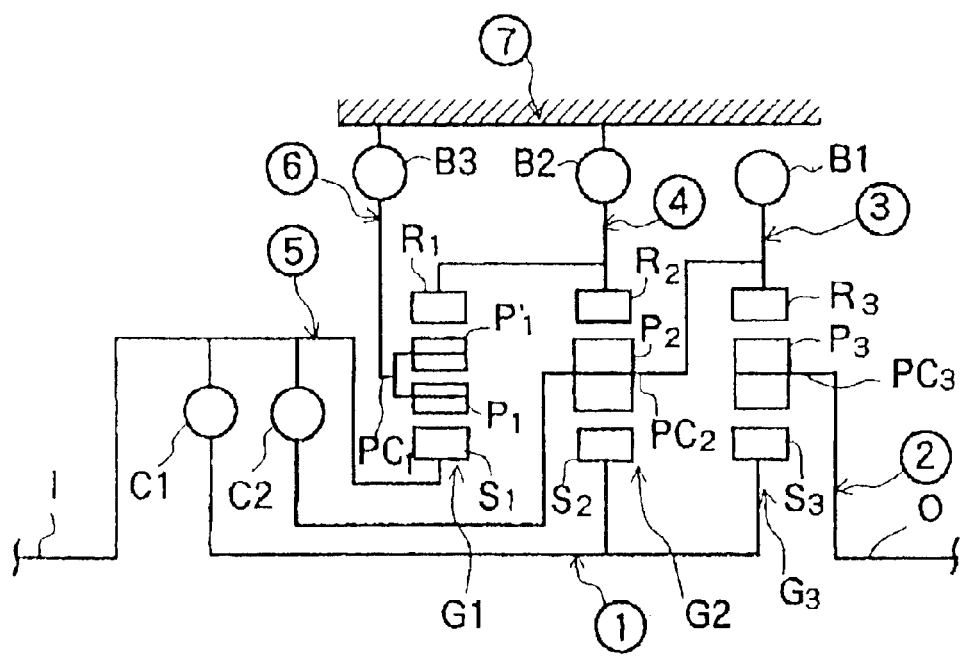
FIG. 11 is a skeletal diagram of a conventional automatic transmission.
Figure 12:
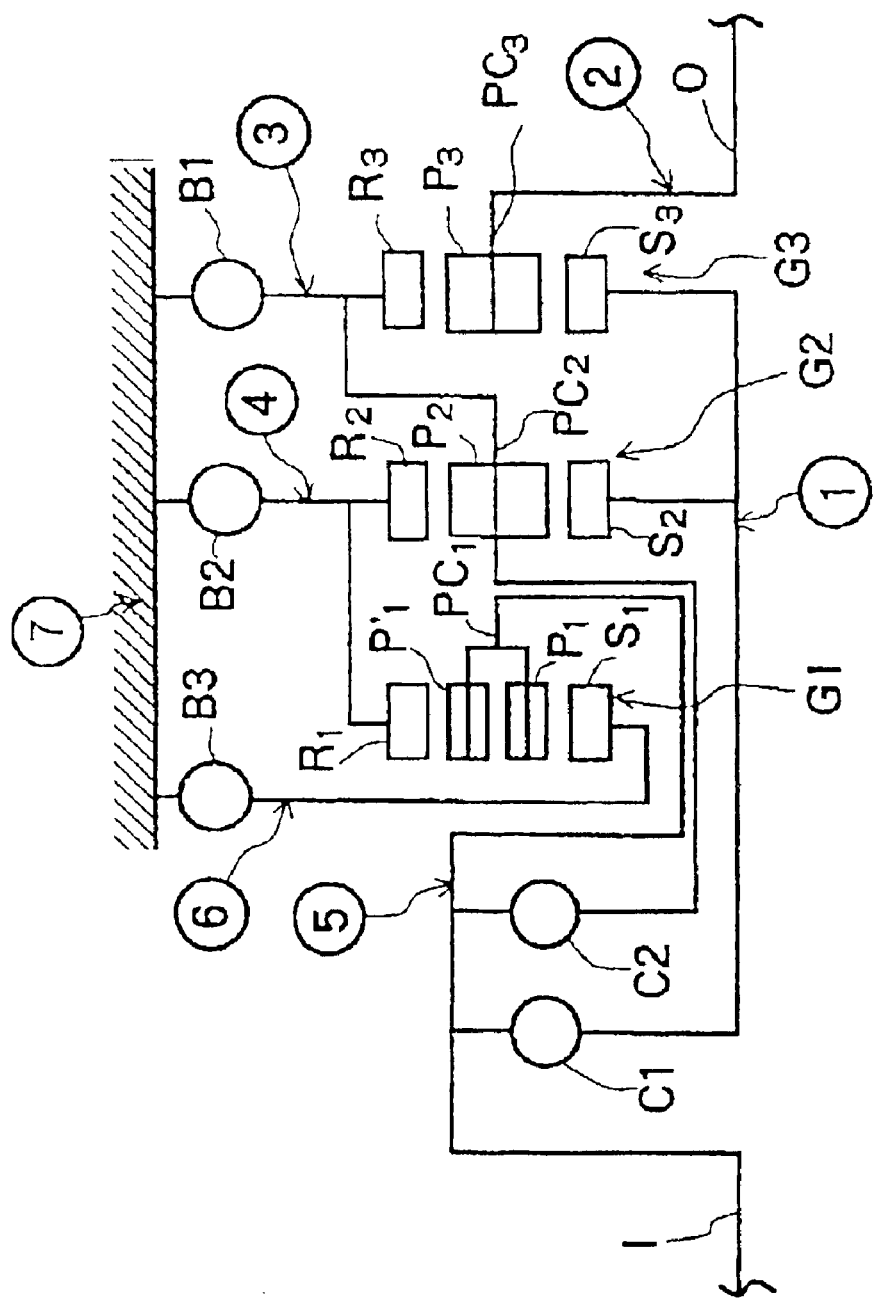
FIG. 12 is a skeletal diagram of another conventional automatic transmission.

As shown in FIG. 9, in this second embodiment, the first clutch C1 and the fourth clutch C4 are interposed between the input shaft 12 and the intermediate shaft 31, and the fourth one-way clutch F4 is interposed between the first clutch C1 and the intermediate shaft 31.

Comparing the table of FIG. 10 of this second embodiment with that of FIG. 6 for the first embodiment, it can be understood that in this second embodiment, in first to fourth speeds, the fourth clutch C4 is engaged only during engine braking and that the fourth one-way clutch F0 is engaged. Because of this difference, shifting from the fourth speed to the fifth speed, which is a clutch-to-brake shift in the first embodiment, is effected smoothly as a one-way clutch shift in the second embodiment. Furthermore, torque transfer during engine braking in the first to fourth speeds, which takes place through only the first clutch C1 in the first embodiment, can pass through both the first and fourth clutches C1 and C4 in the second embodiment. For this reason, the first clutch C1 and the first hydraulic actuator that operates the first clutch C1 can be made smaller.

Note that the second embodiment has been described with reference to the multi-speed speed change mechanism 6, but the automatic transmission according to the present invention is not limited to this, and the present invention may be applied to any automatic transmission having a clutch section 23 which includes at least four clutches disposed together.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An automatic transmission for changing an input rotational speed and for output of one of a plurality of shift speeds, said automatic transmission comprising:

an input shaft;

a planetary gear set that includes at least four-rotating elements;

an output shaft; and a first planetary gear unit, said first planetary gear unit comprising:

a first speed-changing element which receives the rotation of the input shaft at the input rotational speed;

a second speed-changing element that is engaged and disengaged by a first brake and by a combination of a first one-way clutch and a second brake, said second brake engaging and disengaging the first one-way clutch;

a third speed-changing element that transfers rotation at a speed different from the input rotational speed, to said planetary gear set; and wherein the first speed-changing element is connected to a second one-way clutch, and the rotation of the input shaft is transferred through a third clutch.

2. The automatic transmission according to claim 1, wherein said first planetary gear unit has double pinions, wherein said first speed-changing element is a sun gear, wherein said second speed-changing element is a carrier, and wherein said third speed-changing element is a ring gear, and wherein a combination of said first planetary gear unit and said planetary gear set provides at least six forward shift speeds.

3. The automatic transmission according to claim 1, wherein:

said input shaft defines a front side of the automatic transmission and said output shaft defines a rear side of the automatic transmission;

the first brake is positioned radially outward of the first planetary gear unit;

the second brake is located on the front side of the first brake and is substantially axially aligned with the first brake;

a hydraulic actuator for the third brake is provided on a front side of the second brake and is substantially axially aligned with the second brake;

the first one-way clutch is provided on the front side of the first planetary gear unit;

the second one-way clutch is provided on the front side of the first one-way clutch; and the first and second one-way clutches are positioned radially inward of the third brake and a hydraulic actuator for the third brake.

4. The automatic transmission according to claim 3 wherein, in a first shift speed above a forward directly connected shift speed, the first brake is engaged to stop a carrier of the first planetary gear unit, and, on shifting to a second shift speed beyond the directly connected forward shift speed, the first and second brakes are disengaged, and the second one-way clutch is freed and permits reverse rotation of the carrier of the first planetary gear unit.

5. The automatic transmission according to claim 1, wherein said first planetary gear unit has double pinions, wherein said first speed-changing element is a sun gear, wherein said second speed-changing element is a carrier, and wherein said third speed-changing element is a ring gear, and wherein a combination of said first planetary gear unit and said planetary gear set provides at least six forward shift speeds.

6. The automatic transmission according to claim 5, wherein:

said input shaft defines a front side of the automatic transmission and said output shaft defines a rear side of the automatic transmission;

the first brake is positioned radially outward of the first planetary gear unit;

the second brake is located on the front side of the first brake and is substantially axially aligned with the first brake;

a hydraulic actuator for the third brake is provided on a front side of the second brake and is substantially axially aligned with the second brake;

the first one-way clutch is provided on the front side of the first planetary gear unit;

the second one-way clutch is provided on the front side of the first one-way clutch; and the first and second one-way clutches are positioned radially inward of the third brake and a hydraulic actuator for the third brake.

7. The automatic transmission according to claim 6 wherein, in a first shift speed above a forward directly connected shift speed, the first brake is engaged to stop a carrier of the first planetary gear unit, and, on shifting to a second shift speed beyond the directly connected forward shift speed, the first and second brakes are disengaged, and the second one-way clutch is freed and permits reverse rotation of the carrier of the first planetary gear unit.

8. An automatic transmission for changing an input rotational speed and for output of one of a plurality of shift speeds, said automatic transmission comprising:

an input shaft;

a planetary gear set that includes at least four rotating elements;

an output shaft; and a first planetary gear unit, said first planetary gear unit comprising:

a first speed-changing element which receives the rotation of the input shaft at the input rotational speed;

a second speed-changing element that is engaged and disengaged by a first brake and by a combination of a first one-way clutch and a second brake, said second brake engaging and disengaging the first one-way clutch;

a third speed-changing element that transfers rotation at a speed different from the input rotational speed, to said planetary gear set; and wherein said first planetary gear unit has double pinions, wherein said first speed-changing element is a sun gear, wherein said second speed-changing element is a carrier, and wherein said third speed-changing element is a ring gear, and wherein a combination of said first planetary gear unit and said planetary gear set provides at least six forward shift speeds.

9. The automatic transmission according to claim 8, wherein:

said input shaft defines a front side of the automatic transmission and said output shaft defines a rear side of the automatic transmission;

the first brake is positioned radially outward of the first planetary gear unit;

the second brake is located on the front side of the first brake and is substantially axially aligned with the first brake;

a hydraulic actuator for the third brake is provided on a front side of the second brake and is substantially axially aligned with the second brake;

the first one-way clutch is provided on the front side of the first planetary gear unit;

the second one-way clutch is provided on the front side of the first one-way clutch; and the first and second one-way clutches are positioned radially inward of the brake and a hydraulic actuator for the third brake.

10. The automatic transmission according to claim 9 wherein, in a first shift speed above a forward directly connected shift speed, the first brake is engaged to stop a carrier of the first planetary gear unit, and, on shifting to a second shift speed beyond the directly connected forward shift speed, the first and second brakes are disengaged, and the second one-way clutch is freed and permits reverse rotation of the carrier of the first planetary gear unit.

* * * * *

UNITED STATES PATENT AND TRADEMARK OFFICE
CERTIFICATE OF CORRECTION

PATENT NO. : 6,835,158 B2
DATED : December 28, 2004
INVENTOR(S) : Sugiura et al.

It is certified that error appears in the above-identified patent and that said Letters Patent is hereby corrected as shown below:

Column 18,
Line 9, change "four-rotating" to -- four rotating --.

Column 20,
Line 36, change "the brake" to -- the third brake --.

Signed and Sealed this

Twenty-fourth Day of January, 2006

JON W. DUDAS
*Director of the United States Patent and Trademark Office*